Oct. 13, 1953          J. A. NEVISON          2,655,530
METHOD OF PURIFYING ALKYLATED ARYL SULFONATE DETERGENTS
Filed March 30, 1950
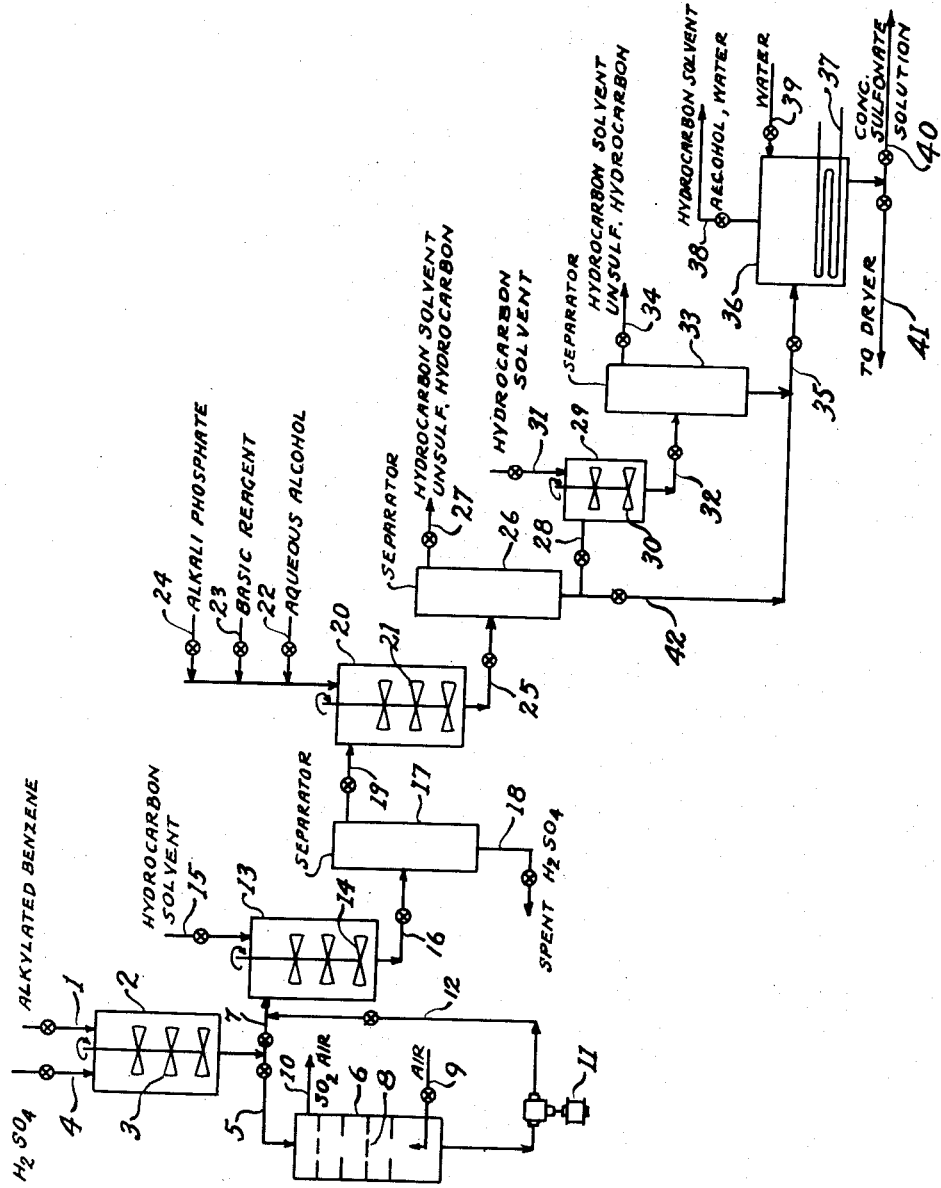
ATTEST
John G. Butz
INVENTOR.
JOHN A. NEVISON
BY Norbert E. Birch Patented Oct. 13, 1953

2,655,530

UNITED STATES PATENT OFFICE 2,655,530

METHOD OF PURIFYING ALKYLATED ARYL SULFONATE DETERGENTS

John A. Nevison, Media, Pa., assignor to The Atlantic Refining Company, Philadelphia, Pa., a corporation of Pennsylvania Application March 30, 1950, Serial No. 152,794

6 Claims. (Cl. 260—505)

The present invention relates to a method for producing improved alkylated aryl sulfonate detergents having excellent wetting, foam, and detergent characteristics, and relates more particularly to the production of such products from alkylated benzenes having from 9 to 15 carbon atoms in the alkyl group, and preferably averaging 12 carbons in the alkyl group.

The method of the present invention comprises sulfonating an alkylated aryl hydrocarbon or hydrocarbon mixture in which the alkyl group contains from 9 to 15 carbon atoms, removing sulfur dioxide from the sulfonation mixture if desired, diluting the sulfonation mixture with an inert hydrocarbon solvent boiling below 400° F., settling and separating the spent sulfonation agent, commingling the hydrocarbon solution of sulfonic acids with aqueous alcohol and a basic reagent to neutralize and extract the sulfonates, separating the aqueous alcohol solution of sulfonates from the hydrocarbon solvent, washing the aqueous alcohol solution with additional hydrocarbon solvent, if desired to remove traces of unsulfonated alkylated aryl hydrocarbon, heating the aqueous alcohol solution to remove hydrocarbon, alcohol, and water to obtain a concentrated aqueous solution of sulfonates, and drying same, if desired, to produce a dry sulfonate detergent.

The alkylated aryl hydrocarbon or hydrocarbon mixture which is employed as the sulfonation stock may be prepared in various ways. In all cases, however, the aryl hydrocarbon may be one or a mixture of two or more of the hydrocarbons such as benzene, commercial benzol, toluene, xylene, ethyl benzene, propyl benzene, isopropyl benzene, naphthalene, methyl naphthalene, ethyl naphthalene, propyl naphthalene, and anthracene. In the production of the alkylated aryl hydrocarbon, the alkylation may be accomplished, for example, by contacting a mixture of the aryl hydrocarbon and an alcohol or mixture of alcohols containing from 9 to 15 carbon atoms, and preferably about 12 carbon atoms, with a suitable alkylation catalyst such as sulfuric acid or a Friedel-Crafts type catalyst such as $AlCl_3$, $SnCl_4$, and $BF_3$. Alternatively, the alkylation of the aryl hydrocarbon may be effected with an alkylating agent such as an aliphatic mono-olefin of from 9 to 15 carbon atoms, or a mixture of such mono-olefins, in the presence of a sulfuric acid catalyst, or $AlCl_3$, $SnCl_4$, $ZnCl_2$, $BF_3$ or HF. Again, the aryl hydrocarbon may be alkylated with a halogenated aliphatic hydrocarbon or halogenated hydrocarbon mixture in which the hydrocarbon radical contains from 9 to 15 carbon atoms. The halogenated hydrocarbon may be obtained by mono-chlorinating a paraffin hydrocarbon, or an essentially paraffinic petroleum distillate such as straight-run naphtha or kerosine, or by reacting a mono-olefin or olefin polymer with HCl to effect addition thereof at the olefinic double bond. Preferably, however, the aryl hydrocarbon may be alkylated with a mono-olefin polymer or mixture of polymers containing from 9 to 15 carbon atoms in the presence of a suitable catalyst such as sulfuric acid, $AlCl_3$, $SnCl_4$, $ZnCl_2$, $BF_3$, or HF. The olefin polymer or polymer mixture is most suitably derived by subjecting a lower olefin to polymerizing conditions in the presence of a catalyst such as phosphoric acid impregnated on a carrier such as kieselguhr. Propylene or gaseous mixtures containing substantial amounts of propylene is preferred. Mixtures of propylene and propylene dimers or trimers may also be used. It is desirable, however, that readily polymerizable olefins such as isobutylene be absent inasmuch as the resulting polymers easily depolymerize under alkylating conditions, and produce alkylated aryl hydrocarbons in which the alkyl group or groups are of short chain length. Most convenient and economic for use are petroleum refinery gas streams which have been fractionated to remove all or substantially all of the butanes, butenes, and heavier hydrocarbons. For example, a refinery gas stream comprising 4.6 mol percent methane, 5.2 mol percent ethylene, 19.5 mol percent ethane, 26.2 mol percent propylene, and 44.5 mol percent propane may be contacted with a supported phosphoric acid catalyst at 300° F. to 600° F. under the a pressure between 200 and 1800 p. s. i., employing a space velocity of 0.05 to 0.15 lb. mols of propylene per lb. of catalyst per hour. The resulting polymers will comprise a complex mixture of olefinic hydrocarbons containing from 6 to about 18 carbon atoms per molecule, and these polymers will not consist solely of dimers, trimers, pentamers, etc., but will include $C_7$, $C_8$, $C_{10}$, $C_{11}$, $C_{13}$, $C_{14}$, and slightly higher polymers due to the interpolymerization of propylene polymer degradation products as well as the presence, in most cases, of ethylene which may be interpolymerized. The polymer mixture may also contain minor amounts of paraffins of various molecular weights as by-products of the polymerization reaction. Preferred conditions for polymerization require temperatures between 450° F. and 500° F. under pressures of 300 to 1000 p. s. i. at a space velocity of about 0.1 lb. mols of propylene per lb. of phosphoric acid catalyst per hour. To obtain a preponderance of polymers averaging 9 carbon atoms, high pressures and high space velocities are desirable, i. e., 1000 to 1800 p. s. i. and 0.15 space velocity. On the other hand, to obtain high yields of polymers averaging 12 carbon atoms with minor amounts of polymers averaging 15 carbon atoms, somewhat lower pressures and space velocities should be used, for example, 200 to 800 p. s. i. and 0.05 to 0.1 space velocity. Depending upon the average chain length or molecular weight of the polymers desired for the alkylation of the aryl hydrocarbon, the crude propylene polymers may be fractionally distilled to obtain the necessary fraction or fractions, and these may be either distillates or distillation residues. In general, the propylene polymers useful in accordance with this invention, i. e., $C_9$ to $C_{15}$ polymers with minor amounts of $C_{18}$ polymers and paraffin hydrocarbons; boil within the range of 240° F. to 530° F. When crude propylene polymers from the phosphoric acid polymerization of a gas stream rich in propylene but containing little or no butanes and butenes is simply topped to remove low boiling polymers and corresponding paraffins, the following products may be obtained as distillation residues.

| | A. S. T. M. Boiling range (atms. press.) | Bromine No. | Average molecular weight | Average number carbon atoms |
|---|---|---|---|---|
| 1 | Over at 240° F., 75% at 340° F., E. P. 480° F | 114 | 136 | 9.75 |
| 2 | Over at 260° F., 50% at 340° F., E. P. 480° F | 108 | 147 | 10.5 |
| 3 | Over at 340° F., 50% at 375° F., E. P. 480° F | 96 | 168 | 12.0 |
| 4 | Over at 420° F., 75% at 460° F., E. P. 500° F | 54 | 210 | 15.0 |

Any of the above polymer fractions may be mixed with an aryl hydrocarbon, for example, 5 to 6 molar equivalents of benzene and 0.05 to 0.1 molar equivalents of a catalyst such as $AlCl_3$, and the alkylation carried out at 100° F. to 180° F., and preferably at 150° F. to 160° F. The catalyst is then separated from the alkylation mixture, the mixture is washed with dilute alkali solution, settled, and water-washed to remove alkali. The alkylation mixture is then fractionally distilled to remove excess benzene, low boiling alklated benzenes resulting as degradation by-products, and small amounts of low boiling olefins and paraffins. The ultimate alkylated benzene products have the properties tabulated below.

| | A. S. T. M. boiling range (atms. press.) | Bromine No. | Average molecular weight | Carbon atom content of alkyl group |
|---|---|---|---|---|
| 1 | Over at 430° F., 60% at 530° F., 93% at 625° F., E. P. 700° F | 1 | 213 | 9.75 |
| 2 | Over at 430° F., 40% at 530° F., 88% at 625° F., E. P. 700° F | .5 | 224 | 10.5 |
| 3 | Over at 450° F., 10% at 530° F., 80% at 625° F., E. P. 700° F | 1 | 245 | 12.0 |
| 4 | Over at 545° F., 40% at 600° F., 75% at 625° F., E. P. 700° F | 2 | 287 | 15.0 |

The above propylene polymer-alkylated benzene fractions are merely typical examples of sulfonation stocks which may be used in accordance with this invention. These fractions or mixtures of two or more thereof may be further fractionated to obtain even closer cut fractions having higher concentrations of any desired individual alkylated benzene or benzenes. For example, product #3 above may be refractionated to give a close cut fraction averaging 12 carbons in the alkyl group and being composed of 24.5% undecyl benzenes, 63% dodecyl benzenes, 6.4% tridecyl benzenes, and the balance (6.0%) paraffinic and olefinic hydrocarbons, such fraction boiling between 530° F. and 595° F. and having an A. P. I. gravity of 31.5° and a bromine number of less than 0.1. Any of the alkylated benzenes or benzene fractions to be used in accordance with this invention may be pretreated with sulfuric acid, for example 5% by volume of 98% $H_2SO_4$ at 80° F. to 120° F. to remove traces of olefins and color bodies prior to sulfonation.

The present invention may be further understood with reference to the accompanying drawing which shows a system suitable for producing improved sulfonate detergents.

A propylene polymer-alkylated benzene fraction having a boiling range of 530° F. to 595° F. and averaging 12 carbon atoms in the alkyl group and containing small amounts of paraffinic and olefinic hydrocarbons is continuously charged through valve-controlled pipe 1 into sulfonation vessel 2 provided with a mechanical stirrer 3. Simultaneously, an approximately equal volume of 98% $H_2SO_4$ is continuously introduced into vessel 2 by valve-controlled pipe 4, and the mixture is vigorously agitated to effect sulfonation of the alkylated benzene at a temperature of 150° F. to 155° F., the residence time in the vessel being of the order of 15 to 30 minutes. The sulfonation of the alkylated benzene is usually 98% to 100% complete, the small amount of paraffins being inert and the olefins being converted to olefin sulfates. Some variation in the sulfonation conditions is permissible, i. e., the quantity of 98% $H_2SO_4$ may vary between 0.9 and 1.1 volumes per volume of alkylated benzene fraction, and fuming sulfuric acid (120% $H_2SO_4$) may be used in similar or lesser amounts at temperatures as low as 60° F. The sulfonation temperature with 98% $H_2SO_4$ may vary between 130° F. and 160° F., although temperatures of 150° F. to 155° F. are preferred. The sulfonation mixture, usually containing sulfur dioxide, is withdrawn from vessel 2 and passed by valve-controlled pipe 5 into the sulfur dioxide removal tower 6, valve-controlled pipe 7 being closed. In tower 6 the sulfonation mixture passes downward through perforated plates or trays 8 at a temperature preferably below 125° F. and is intimately contacted with a stream of air or other inert gas supplied through valve-controlled pipe 9, and the sulfur dioxide is stripped from the sulfonation mixture and vented, with the air, from the top of the tower by pipe 10. In the event that the sulfur dioxide content of the sulfonation mixture is low, the air blowing step may be omitted and the mixture may be passed by valve-controlled pipe 7 directly to mixing vessel 13. Otherwise, the mixture after air blowing is delivered from tower 6 by pump 11 through valve-controlled pipe 12 into mixing vessel 13 wherein the sulfonation mixture is thoroughly admixed by mechanical stirrer 14 with from 4 to 10 volumes, and preferably 6 to 8 volumes of an inert hydrocarbon solvent introduced by valve-controlled pipe 15. Such hydrocarbon solvent should boil below 400° F., and preferably within the range of 100° F. to 400° F., and is exemplified by benzene, toluene, xylene, ethyl benzene, propyl benzene or cumene. These aromatic hydrocarbons or mixtures of two or more thereof are suitable in the processing of any one or mixture of alkylated aryl sulfonic acids in which the alkyl group contains from 9 to 15 carbon atoms. However, when the alkyl group averages 12 carbon atoms or more, paraffinic solvents such as petroleum naphtha having an end point below 400° F., for example, naphtha boiling between 175° F. and 225° F., or the $C_5$ to $C_{12}$ paraffin hydrocarbons or hydrocarbon mixtures may be employed in lieu of the aromatic hydrocarbon solvents. The function of the hydrocarbon solvent is to extract from the sulfonation mixture the alkylated benzene sulfonic acids, unsulfonated alkylated benzene, if any, and inert paraffin hydrocarbons initially present in the alkylated benzene charge stock, as well as to permit clean and rapid settling of spent sulfonating agent. Upon thorough contacting of the sulfonation mixture with the hydrocarbon solvent, two immiscible liquid phases are formed, and these are passed from mixed 13 through valve-controlled pipe 16 into separator 17. Therein, the phases are permitted to separate and stratify, the upper liquid phase or layer comprising hydrocarbon solvent containing dissolved alkylated benzene sulfonic acids, unsulfonated alkylated benzene, if any, inert paraffin hydrocarbons, and traces of sulfuric acid. The lower liquid phase or layer comprising spent sulfonation agent (approximately 78%–80% concentration $H_2SO_4$), olefin sulfates, and minor amounts of hydrocarbon solvent is drawn from the bottom of separator 17 through valve-controlled pipe 18 and sent to solvent and acid recovery systems not shown. The upper or solvent phase containing alkylated benzene sulfonic acids, unsulfonated alkylated benzene, if any, minor amounts of inert paraffins, and traces of spent sulfuric acid is passed from the top of separator 17 by valve-controlled pipe 19 into mixing vessel 20 provided with a mechanical mixer 21. In vessel 20 the hydrocarbon solution of sulfonic acids is thoroughly mixed with an aqueous alcohol solution and a basic reagent (preferably in aqueous solution or suspension) supplied by valve-controlled pipes 22 and 23, respectively. The basic reagent may be a strong base such as sodium or potassium hydroxide (preferably 25% concentration in water) or it may be an aqueous suspension of magnesium oxide or hydroxide, the amount of the basic reagent used being sufficient to neutralize the acidic components of the hydrocarbon solution (pH 7 to 8). The alcohol employed may be methanol, ethanol, propanol, or isopropanol, preference being had for methanol. About 4 volumes of 40%–50% aqueous methanol, based upon the original amount of alkylated benzene, together with sufficient 25% NaOH is suitable for effecting extraction and neutralization of the alkylated benzene sulfonic acids in which the alkyl group averages 12 carbon atoms. The concentration and amount of aqueous alcohol and of the alkali solution must be carefully controlled in order to obtain a clean separation of the neutralized sulfonic acids or sulfonates. The presence of too much water gives rise to emulsification difficulties and poor separation, while too much alcohol prevents the separation of the sulfonates from the hydrocarbon solvent due to the solubility of the alcohol therein. Depending upon the average molecular weight of the alkylated aryl sulfonic acids or the average number of carbon atoms in the alkyl group, from 2 to 5 volumes of 25% to 60% aqueous alcohol, based on the original alkylated aryl hydrocarbon, will give satisfactory extractions where the alkyl groups range from 9 to 15 carbon atoms. For example, with mixtures of 75% $C_9$–25% $C_{12}$ or 50% $C_9$–50% $C_{12}$ alkyl benzene sulfonic acids, 2.5 to 3.5 volumes of 25%–35% aqueous alcohol is sufficient for clean separation. The use of water alone, or of aqueous caustic solutions, will not give satisfactory extraction or separation of $C_9$ to $C_{15}$ alkyl benzene sulfonic acids or sulfonates from hydrocarbon solvent solutions.

In mixer 20, extraction and neutralization of the alkylated benzene sulfonic acids is effected. If desired, a small amount of an alkali phosphate, for example 1% of sodium phosphate (based upon the ultimate sulfonate product) may be introduced through valve-controlled pipe 24 in order to reduce equipment corrosion and to stabilize the sulfonate product. In mixer 20, two immiscible liquid phases are formed, and this mixture is delivered from the mixer to separator 26 by valve-controlled pipe 25. In separator 26, the immiscible liquid phases are permitted to separate and stratify, the upper liquid phase or layer comprising hydrocarbon solvent, unsulfonated alkylated benzene, if any, and small amounts of paraffin hydrocarbons and alcohol, and the lower liquid phase or layer comprising an aqueous alcohol solution of alkylated benzene sulfonates containing small amounts of inorganic salts, and from 10% to 30% of hydrocarbon solvent carrying very small amounts of unsulfonated alkylated benzene, if any, and inert paraffins. The upper layer is drawn from the top of separator 26 and passed through valve-controlled pipe 27 to a solvent recovery system not shown, while the aqueous alcohol solution of sulfonates is drawn from the bottom of separator 26 and delivered by valve-controlled pipe 28 to mixing vessel 29 provided with mechanical stirrer 30. Additional hydrocarbon solvent, for example, 3 to 5 volumes per volume or original alkylated benzene, is introduced into separator 29 by valve-controlled pipe 31, and the aqueous alcohol solution is vigorously contacted with the hydrocarbon solvent by means of the stirrer 30. The immiscible mixture is then passed from mixer 29 by valve-controlled pipe 32 into separator 33, wherein the hydrocarbon solvent phase containing extracted inert paraffins and unsulfonated alkylated benzene, if any, form an upper layer and the aqueous alcohol solution of alkylated benzene sulfonates containing small amounts of inorganic salts, and from 10% to 30% of hydrocarbon solvent containing trace amounts of inert paraffins and unsulfonated alkylated benzene, if any, forms a lower layer. The upper hydrocarbon solvent layer is drawn from the top of separator 33 and passed through valve-controlled pipe 34 to a solvent recovery system not shown. The aqueous alcoholic solution of purified sulfonates containing 10% to 30% of hydrocarbon solvent with trace amounts of inert paraffins and unsulfonated alkylated benzene, if any, is drawn from the bottom of separator 33 and passed by valve-controlled pipe 35 to evaporator 36 provided with a steam coil 37. The aqueous alcohol solution is heated to a temperature preferably not in excess of 240° F.–250° F. and the hydrocarbon solvent, alcohol, and a portion of the water is vaporized and passed by valve-controlled pipe 38 to a recovery system not shown. Additional water may be added to the solution in the evaporator by means of valve-controlled pipe 39, if necessary. Alternatively, steam stripping may be employed when the hydrocarbon solvent is higher boiling than benzene or toluene, for example, when 400° F. end point petroleum naphtha constitutes the solvent. The resulting concentrated (30%–40%) aqueous solution of alkylated benzene sulfonates containing a minor amount of inorganic salts and traces of hydrocarbons is withdrawn from evaporator 36 and may be passed to storage by valve-controlled pipe 40, or to spray dryers or drum dryers by means of valve-controlled pipe 41 to obtain an essentially dry sulfonate product. In one modification of the system, the hydrocarbon solvent washing of the aqueous alcohol solution of sulfonates may be omitted if the sulfonate solution contains only trace amounts of unsulfonated hydrocarbon or inert paraffins. In this case, the aqueous alcohol solution may be delivered directly from separator 26 by valve-controlled pipe 42 to the evaporator 36.

The alkylated benzene sulfonates produced by the above process have the following composition (dry basis):

| | Percent |
|---|---|
| Alkylated benzene sulfonates averaging 12 carbon atoms in the alkyl group | 88– 92 |
| Unsulfonated hydrocarbon | 0.05–0.10 |
| Inorganic salts (mostly $Na_2SO_4$) | 8– 12 |

The alkylated aryl sulfonates prepared in accordance with the present invention are markedly superior to sulfonates produced from the same alkylated aryl hydrocarbon stocks by the conventional method of direct neutralization of the sulfonated hydrocarbons. Such superiority is especially evidenced by improved surface tension reduction and foam characteristics in dilute aqueous solution, particularly in the presence of a builder such as $Na_2SO_4$.

The present invention may be further illustrated by the following examples, which, however, are not to be construed as limiting the scope thereof. The sulfonates produced in accordance with the present invention were tested for surface tension and for foam characteristics. By way of comparison, the same tests were performed upon sulfonates from the same alkylated benzene fractions produced by the conventional method of direct neutralization (no extraction or washing steps) of the sulfonation mixture.

The surface tension measurements were made at 25° C. employing the conventional Du Nuoy tensimeter at detergent concentrations of 0.05% and 0.1% by weight in distilled water, the detergents in all cases comprising essentially 35% active sulfonate–65% $Na_2SO_4$.

The foam tests were conducted in accordance with the Ross and Miles procedure described in "Oil and Soap," May 1941, pages 99–102. The foam heights at 0.1% detergent concentration (35% sulfonate–65% $Na_2SO_4$) in water of 300 p. p. m. hardness were measured in millimeters at 110° F., the first measurement being the initial or instantaneous foam height and the second measurement being the foam height after 5 minutes standing. The preparations and properties of the various alkylated benzene sulfonate detergents are given below.

The amount of unsulfonated (or sulfonatable) hydrocarbon contained in the sulfonate was determined by slowly adding 200 g. of sulfonate to 600 cc. of 50% aqueous methanol with constant agitation. After stirring the solution for 1 minute, the precipitated inorganic salts were settled out, and the solution decanted and filtered. The salts were washed with 100 cc. of 50% aqueous methanol and added to the filtrate. The entire filtrate was washed with 500 cc. of 88° petroleum naphtha in the following proportions: one 200 cc. portion and three 100 cc. portions. The combined washings were thoroughly agitated with 60 cc. of 50% aqueous methanol, and the latter then separated. The naphtha washings were evaporated to 10–20 cc. on a steam bath, and the residue transferred to a tared evaporating dish and evaporated to constant weight on a 300° F. hot plate. The weight of this residue×100 divided by the weight of the sulfonate sample (dry basis) equals the weight percent unsulfonated hydrocarbon in the sulfonate sample (dry basis).

1. A propylene polymer-alkylated benzene fraction having an A. S. T. M. distillation range of 430° F. to 700° F. (over point 430° F., 60% @ 530° F., 93% @ 625° F., and end point @ 700° F.), a bromine number of 1, and an average alkyl carbon atom weight of 213, and an average alkyl carbon atom content of 9.75 was sulfonated by contacting with 0.95 volume of 98% $H_2SO_4$ at 150° F. for 25 minutes.

(a) One portion of the resulting sulfonation mixture (sulfonic acids, spent sulfuric acid, and unsulfonated or unsulfonatable hydrocarbon) was air blown at 100° F. to remove sulfur dioxide, then extracted with 6 volumes of benzene (based on the original alkylated benzene charge), and the spent sulfuric acid settled and removed. The benzene solution of sulfonic acids containing minor amounts of unsulfonated hydrocarbon and sulfuric acid was mixed with 3 volumes of 30% methanol (based on the original alkylated benzene charge) and with sufficient 25% aqueous NaOH to neutralize the acidic components (7.5). The aqueous methanol solution of sodium sulfonates containing minor amounts of unsulfonated hydrocarbon and inorganic salts ($Na_2SO_4$) was separated from the benzene by decantation, and the aqueous methanol solution was washed with 4 volumes of benzene (based upon the original alkylated benzene charge), and the benzene washings containing unsulfonated hydrocarbon and minor amounts of methanol were separated from the washed aqueous methanol solution of sulfonates. The aqueous methanol solution was then evaporated to remove methanol, benzene, and water, and the resulting concentrated sulfonated solution was dried and the product analyzed. Such product comprises 88.4% sodium sulfonate, 11.5% inorganic salt (mostly $Na_2SO_4$), and 0.07% unsulfonated hydrocarbon.

(b) The remaining portion of the sulfonation mixture comprising alkylated benzene sulfonic acids, spent sulfuric acid, and unsulfonated hydrocarbon in minor amounts, was directly neutralized with 25% aqueous NaOH to pH 7.5, and the neutralized product was evaporated and dried, and the dried product was analyzed. Such product comprised 37.1% sodium sulfonate, 61.3% inorganic salts (mostly $Na_2SO_4$), and 1.57% unsulfonated hydrocarbon.

(c) The same alkylated benzene fraction employed in (1) above was sulfonated by contacting with 0.9 volume of 98% $H_2SO_4$ at 130° F. for 15 minutes, and the resulting sulfonation mixture comprising alkylated benzene sulfonic acids, spent sulfuric acid, and unsulfonated hydrocarbons in minor amounts, was directly neutralized with 25% aqueous NaOH to pH 7.5 and the neutralized product was evaporated and dried, and the dried product was analyzed. Such product comprised 38.1% sodium sulfonate, 58.8% inorganic salts (mostly $Na_2SO_4$), and 3.08% unsulfonated hydrocarbon.

Each of the products from (a), (b), and (c) was adjusted to give a detergent having a ratio of 35 parts of sodium sulfonate to 65 parts of $Na_2SO_4$ by the addition of the required amount of $Na_2SO_4$, and the resulting products were dissolved in water to give detergent concentrations of 0.05% and 0.1% by weight. The Ross Miles foam and the surface tension values are tabulated below.

| Detergent | Unsulfonated hydrocarbon content | Ross-Miles foam | | Surface tension | |
|---|---|---|---|---|---|
| 1 | | Initial | 5 min. | 0.05% | 0.1% |
| | Percent | | | | |
| (a) | 0.07 | 85 | 75 | 31.8 | 27.5 |
| (b) | 1.57 | 70 | 60 | 31.9 | 28.7 |
| (c) | 3.08 | 50 | 45 | 34.7 | 29.6 |

2. A propylene polymer-alkylated benzene fraction having an A. S. T. M. distillation range of 450° F. to 700° F. (over point 450° F., 10% @ 530° F., 80% @ 625° F., and end point @ 700° F.), a bromine number of 1, an average molecular weight of 245, and an average alkyl carbon atom content of 12 was sulfonated by contacting with 0.95 volume of 98% $H_2SO_4$ at 150° F. for 25 minutes.

(a) One portion of the resulting sulfonation mixture (sulfonic acids, spent sulfuric acid, and unsulfonated or unsulfonatable hydrocarbon) was air blown at 100° F. to remove sulfur dioxide, then extracted with 6 volumes of benzene (based on the original alkylated benzene charge), and the spent sulfuric acid settled and removed. The benzene solution of sulfonic acids containing minor amounts of unsulfonated hydrocarbon and sulfuric acid was mixed with 4 volumes of 40% methanol (based on the original alkylated benzene charge) and with sufficient 25% aqueous NaOH to neutralize the acidic components (pH 7.5). The aqueous methanol solution of sodium sulfonates containing minor amounts of unsulfonated hydrocarbon and inorganic salts ($Na_2SO_4$) was separated from the benzene by decantation, and the aqueous methanol solution was washed with 4 volumes of benzene (based upon the original alkylated benzene charge), and the benzene washings containing unsulfonated hydrocarbon and minor amounts of methanol were separated from the washed aqueous methanol solution of sulfonates. The aqueous methanol solution was then evaporated to remove methanol, benzene, and water, and the resulting concentrated sulfonated solution was dried and the product analyzed. Such product comprised 88.6% sodium sulfonate, 11.3% inorganic salt (mostly $Na_2SO_4$), and 0.1% unsulfonated hydrocarbon.

(b) The remaining portion of the sulfonation mixture comprising alkylated benzene sulfonic acids, spent sulfuric acid, and unsulfonated hydrocarbon in minor amounts, was directly neutralized with 25% aqueous NaOH to pH 7.5, and the neutralized product was evaporated and dried, and the dried product was analyzed. Such product comprised 36.2% sodium sulfonate, 62.0% inorganic salts (mostly $Na_2SO_4$), and 1.3% unsulfonated hydrocarbon.

(c) The same alkylated benzene fraction employed in (2) above was sulfonated by contacting with 0.9 volume of 98% $H_2SO_4$ at 130° F. for 15 minutes, and the resulting sulfonation mixture comprising alkylated benzene sulfonic acids, spent sulfuric acid, and unsulfonated hydrocarbons in minor amounts, was directly neutralized with 25% aqueous NaOH to pH 7.5, and the neutralized product was evaporated and dried, and the dried product was analyzed. Such product comprised 36.4% sodium sulfonate, 60.1% inorganic salts (mostly $Na_2SO_4$), and 3.47% unsulfonated hydrocarbon.

Each of the products from (a), (b), and (c) was adjusted to give a detergent having a ratio of 35 parts of sodium sulfonate to 65 parts of $Na_2SO_4$ by the addition of the required amount of $Na_2SO_4$, and the resulting products were dissolved in water to give detergent concentrations of 0.05% and 0.1% by weight. The Ross-Miles foam and the surface tension values are tabulated below.

| Detergent | Unsulfonated hydrocarbon content | Ross-Miles foam | | Surface tension | |
|---|---|---|---|---|---|
| 2 | | Initial | 5 min. | 0.05% | 0.1% |
| | Percent | | | | |
| (a) | 0.1 | 205 | 185 | 34.9 | 29.6 |
| (b) | 1.8 | 170 | 155 | 35.9 | 31.1 |
| (c) | 3.47 | 95 | 85 | 40.9 | 33.5 |

3. A propylene polymer-alkylated benzene fraction having an A. S. T. M. distillation range of 518° F. to 580° F. (over point 518° F., 40% @ 544° F., 90% @ 560° F., and end point @ 580° F.), a bromine number of 0.1, an average molecular weight of 245, and an average alkyl carbon atom content of 12 was sulfonated by contacting with 0.95 volume of 98% $H_2SO_4$ at 150° F. for 25 minutes.

(a) One portion of the resulting sulfonation mixture (sulfonic acids, spent sulfuric acid, and unsulfonated or unsulfonatable hydrocarbon) was air blown at 100° F. to remove sulfur dioxide, then extracted with 6 volumes of benzene (based on the original benzene charge), and the spent sulfuric acid settled and removed. The benzene solution of sulfonic acids containing minor amounts of unsulfonated hydrocarbon and sulfuric acid was mixed with 4 volumes of 40% methanol (based on the original alkylated benzene charge), and with sufficient 25% aqueous NaOH to neutralize the acidic components (pH 7.5). The aqueous methanol solution of sodium sulfonates containing minor amounts of unsulfonated hydrocarbon and inorganic salts ($Na_2SO_4$) was separated from the benzene by decantation, and the aqueous methanol solution was washed with 4 volumes of benzene (based upon the original alkylated benzene charge), and the benzene washings containing unsulfonated hydrocarbon and minor amounts of methanol were separated from the washed aqueous methanol solution of sulfonates. The aqueous methanol solution was then evaporated to remove methanol, benzene, and water, and the resulting concentrated sulfonated solution was dried and the product analyzed. Such product comprised 88.7% sodium sulfonate, 11.2% inorganic salt (mostly $Na_2SO_4$), and 0.1% unsulfonated hydrocarbon.

(b) The remaining portion of the sulfonation mixture comprising alkylated benzene sulfonic acids, spent sulfuric acid, and unsulfonated hydrocarbon in minor amounts, was directly neutralized with 25% aqueous NaOH to pH 7.5, and the neutralized product was evaporated and dried, and the dried product was analyzed. Such product comprised 36.8% sodium sulfonate, 62.1% inorganic salts (mostly $Na_2SO_4$), and 1.01% unsulfonated hydrocarbon.

(c) The same alkylated benzene fraction employed in (3) above was sulfonated by contacting with 0.9 volume of 98% $H_2SO_4$ at 130° F. for 15 minutes, and the resulting sulfonation mixture, comprising alkylated benzene sulfonic acids, spent sulfuric acid, and unsulfonated hydrocarbons in minor amounts, was directly neutralized with 25% aqueous NaOH to pH 7.5, and the neutralized product was evaporated and dried, and the dried product was analyzed. Such product comprised 36.9% sodium sulfonate, 60.2% inorganic salts (mostly $Na_2SO_4$), and 2.84% unsulfonated hydrocarbon.

Each of the products from (a), (b), and (c) was adjusted to give a detergent having a ratio of 35 parts of sodium sulfonate to 65 parts of $Na_2SO_4$ by the addition of the required amount of $Na_2SO_4$, and the resulting products were dissolved in water to give detergent concentrations of 0.05% and 0.1% by weight. The Ross-Miles foam and the surface tension values are tabulated below.

| Detergent | Unsulfonated hydrocarbon content | Ross-Miles foam | | Surface tension | |
|---|---|---|---|---|---|
| 3 | | Initial | 5 min. | 0.05% | 0.1% |
| | Percent | | | | |
| (a) | 0.1 | 230 | 205 | 38.9 | 30.5 |
| (b) | 1.01 | 210 | 185 | 40.0 | 33.7 |
| (c) | 2.84 | 185 | 165 | | |

4. A propylene polymer-alkylated benzene fraction having an A. S. T. M. distillation range of 502° F. to 612° F. (over point 502° F., 40% @ 550° F., 90% @ 581° F., and end point @ 612° F.), a bromine number of 0.1, an average molecular weight of 245, and an average alkyl carbon atom content of 12 was sulfonated by contacting with 0.95 volume of 98% $H_2SO_4$ at 150° F. for 25 minutes.

(a) One portion of the resulting sulfonation mixture (sulfonic acids, spent sulfuric acid, and unsulfonated or unsulfonatable hydrocarbon) was air blown at 100° F. to remove sulfur dioxide, then extracted with 6 volumes of benzene (based on the original alkylated benzene charge), and the spent sulfuric acid settled and removed. The benzene solution of sulfonic acids containing minor amounts of unsulfonated hydrocarbon and sulfuric acid was mixed with 4 volumes of 40% methanol (based on the original alkylated benzene charge) and with sufficient 25% aqueous NaOH to neutralize the acidic components (pH 7.5). The aqueous methanol solution of sodium sulfonates containing minor amounts of unsulfonated hydrocarbon and inorganic salts ($Na_2SO_4$) was separated from the benzene by decantation, and the aqueous methanol solution was washed with 4 volumes of benzene (based upon the original alkylated benzene charge), and the benzene washings containing unsulfonated hydrocarbon and minor amounts of methanol were separated from the washed aqueous methanol solution of sulfonates. The aqueous methanol solution was then evaporated to remove methanol, benzene, and water, and the resulting concentrated sulfonated solution was dried and the product analyzed. Such product comprised 88.6% sodium sulfonate, 11.3% inorganic salt (mostly $Na_2SO_4$), and 0.08% unsulfonated hydrocarbon.

(b) The remaining portion of the sulfonation mixture comprising alkylated benzene sulfonic acids, spent sulfuric acid, and unsulfonated hydrocarbon in minor amounts, was directly neutralized with 25% aqueous NaOH to pH 7.5, and the neutralized product was evaporated and dried, and the dried product was analyzed. Such product comprised 36.9% sodium sulfonate, 62.0% inorganic salts (mostly $Na_2SO_4$), and 1.12% unsulfonated hydrocarbon.

(c) The same alkylated benzene fraction employed in (4) above was sulfonated by contacting with 0.9 volume of 98% $H_2SO_4$ at 130° F. for 15 minutes, and the resulting sulfonation mixture comprising alkylated benzene sulfonic acids, spent sulfuric acid, and unsulfonated hydrocarbons in minor amounts, was directly neutralized with 25% aqueous NaOH to pH 7.5, and the neutralized product was evaporated and dried, and the dried product was analyzed. Such product comprised 37% sodium sulfonate, 60% inorganic salts (mostly $Na_2SO_4$), and 2.96% unsulfonated hydrocarbon.

Each of the products from (a), (b), and (c) was adjusted to give a detergent having a ratio of 35 parts of sodium sulfonate to 65 parts of $Na_2SO_4$ by the addition of the required amount of $Na_2SO_4$, and the resulting products were dissolved in water to give detergent concentrations of 0.05% and 0.1 by weight. The Ross-Miles foam and the surface tension values are tabulated below.

| Detergent | Unsulfonated hydrocarbon content | Ross-Miles foam | | Surface tension | |
|---|---|---|---|---|---|
| 4 | | Initial | 5 min. | 0.05% | 0.1% |
| | Percent | | | | |
| (a) | 0.08 | 215 | 195 | 34.1 | 28.8 |
| (b) | 1.12 | 185 | 165 | 38.2 | 31.5 |
| (c) | 2.96 | 125 | 105 | | |

From the above data it is evident that the production of sulfonate detergents in accordance with the present invention is a very substantial improvement over the conventional method of direct neutralization, since the products of this invention have a very low unsulfonated hydrocarbon content, and much better foam and surface tension characteristics. The foaming property of the detergents is of great importance in the marketing thereof, since, for example, although two sulfonate detergents may have more or less the same detergent properties, the one having a greater foaming-producing ability and foam stability will take preference in the market, inasmuch as the user of the detergent gages the amount necessary for use in a washing operation and the efficiency thereof by the amount of foam produced.

The improved sulfonates obtained in accordance with the present invention may be mixed with one or more of a variety of other detergents, builders, and the like, including alkali metal sulfates, silicates, orthophosphates, metaphosphates, pyrophosphates, tri and tetrapolyphosphates, primary and secondary alkyl sulfates, sulfated glycerol esters, aliphatic sulfonates, sulfonated esters or amides of the fatty acids, polyglycol ethers of alkyl phenols and the sulfonated or sulfated derivatives, salts of alkyl and alkenyl succinic acids and their esters, alkyl polyglycol ethers, polyglycol derivatives of alkyl amines, soaps of the higher fatty acids, sulfated ethers, alkyl hydroxy aromatic sulfonates, and alkyl polyalkylene polyamines.

Also, in one modification of the extraction procedure of the instant invention, the hydrocarbon solution of the sulfonic acids, after separation from the spent sulfonating agent, may be treated with aqueous alcohol and sufficient basic reagent to only partially neutralize the acidic constituents (pH 3 to 6), and the aqueous alcohol solution of sulfonates and sulfonic acids then separated from the initial hydrocarbon solvent, further washed with additional hydrocarbon solvent and, after separation of the wash, finally completely neutralized and evaporated to give concentrated aqueous sulfonate solution, or dry sulfonates.

Alternatively, the initial hydrocarbon solution of sulfonic acids, after separation of the spent sulfonating agent, may be treated with aqueous alcohol to extract the sulfonic acids. The resulting aqueous alcoholic extract, after partial or complete neutralization, may be washed with additional hydrocarbon solvent, and the washed aqueous alcohol solution, if not completely neutral may be rendered so, and then evaporated to produce a concentrated aqueous sulfonate solution or dry sulfonates.

I claim:

1. A method for producing an improved alkylated aryl sulfonate detergent containing not more than 0.1% by weight of unsulfonated hydrocarbon from the sulfonation mixture obtained by intimately contacting an alkylated aryl hydrocarbon containing from 9 to 15 carbon atoms in the alkyl group with a sulfonating agent, which comprises diluting the sulfonation mixture with a hydrocarbon solvent boiling below 400° F. to dissolve the alkylated aryl sulfonic acids but not the spent sulfonating agent, settling and separating the hydrocarbon solution of the sulfonic acids from the spent sulfonating agent, intimately contacting the hydrocarbon solution of sulfonic acids with 2 to 5 volumes, per volume of original alkylated aryl hydrocarbon, of a 25% to 60% aqueous alcohol solution and a sufficient amount of a basic reagent to neutralize the mixture, forming two immiscible liquid phases, one comprising essentially hydrocarbon solvent and minor amounts of unsulfonated alkylated aryl hydrocarbon, and the other comprising an aqueous alcohol solution of sulfonates containing minor amounts of hydrocarbon solvent, unsulfonated alkylated aryl hydrocarbon, and inorganic salts, separating the immiscible phases from one another, intimately contacting the aqueous alcoholic solution comprising the second phase with an additional quantity of said hydrocarbon solvent, forming two immiscible liquid phases, one comprising essentially hydrocarbon solvent and residual unsulfonated alkylated aryl hydrocarbon and the other comprising an aqueous alcohol solution of sulfonates containing a minor amount of hydrocarbon solvent and traces of unsulfonated alkylated aryl hydrocarbon, separating the phases from one another, and heating the aqueous alcohol solution of sulfonates to remove alcohol, water, and hydrocarbon solvent.

2. A method for producing an improved alkylated benzene sulfonate detergent containing not more than 0.1% by weight of unsulfonated hydrocarbon from the sulfonation mixture obtained by intimately contacting an alkylated benzene hydrocarbon containing from 9 to 15 carbon atoms in the alkyl group with sulfuric acid thereof, which comprises diluting the sulfonation mixture with an aromatic hydrocarbon solvent boiling below 400° F. to dissolve the alkylated benzene sulfonic acids but not the spent sulfuric acid, settling and separating the aromatic hydrocarbon solution of the sulfonic acids from the spent sulfuric acid, intimately contacting the hydrocarbon solution of sulfonic acids with 2 to 5 volumes, per volume of original alkylated benzene hydrocarbon, of a 25% to 60% aqueous methanol solution and a sufficient amount of an alkali metal hydroxide to neutralize the mixture, forming two immiscible liquid phases, one comprising essentially aromatic hydrocarbon solvent and minor amounts of unsulfonated alkylated benzene, and the other comprising an aqueous methanol solution of sulfonates containing minor amounts of aromatic hydrocarbon solvent, unsulfonated alkylated benzene, and alkali metal sulfate, separating the immiscible phases from one another, intimately contacting the aqueous methanol solution comprising the second phase with an additional quantity of said aromatic hydrocarbon solvent, forming two immiscible liquid phases, one comprising essentially aromatic hydrocarbon solvent and residual unsulfonated alkylated benzene and the other comprising an aqueous methanol solution of sulfonates containing a minor amount of aromatic hydrocarbon solvent and traces of unsulfonated alkylated benzene, separating the phases from one another, and heating the aqueous methanol solution of sulfonates to remove methanol, water, and aromatic hydrocarbon solvent.

3. A method for producing an improved alkylated benzene sulfonate detergent containing not more than 0.1% by weight of unsulfonated hydrocarbon from the sulfonation mixture obtained by intimately contacting an alkylated benzene containing from 9 to 15 carbon atoms in the alkyl group with 98% to 120% sulfuric acid at 60° F. to 160° F., which comprises diluting the sulfonation mixture with 4 to 10 volumes of benzene per volume of original alkylates benzene to dissolve the alkylated benzene sulfonic acids but not the spent sulfuric acid, settling and separating the benzene solution of the sulfonic acids from the spent sulfuric acid, intimately contacting the benzene solution of sulfonic acids with 2 to 5 volumes, per volume of original alkylated benzene of an aqueous solution containing 25% to 60% of methanol with a sufficient amount of sodium hydroxide to neutralize the mixture, forming two immiscible liquid phases, one comprising essentially benzene and minor amounts of unsulfonated alkylated benzene, and the other comprising an aqueous methanol solution of sulfonates containing minor amounts of benzene, unsulfonated alkylated benzene, and sodium sulfate, separating the immiscible phases from one another, intimately contacting the aqueous methanol solution comprising the second phase with 3 to 5 volumes of benzene per volume of original alkylated benzene, forming two immiscible liquid phases, one comprising essentially benzene and residual unsulfonated alkylated benzene and the other comprising an aqueous methanol solution of sulfonates containing a minor amount of benzene and traces of unsulfonated alkylated benzene, separating the phases from one another, and heating the aqueous methanol solution of sulfonates to remove methanol, water, and benzene.

4. A method according to claim 1 in which a mixture of alkylated aryl hydrocarbons averaging 12 carbon atoms in the alkyl group is employed in lieu of an alkylated aryl hydrocarbon containing from 9 to 15 carbon atoms in the alkyl group.

5. A method according to claim 2 in which a mixture of alkylated benzenes averaging 12 carbon atoms in the alkyl group is employed in lieu of an alkylated benzene hydrocarbon containing from 9 to 15 carbon atoms in the alkyl group.

6. A method according to claim 3 in which a mixture of alkylated benzenes averaging 12 carbon atoms in the alkyl group is employed in lieu of an alkylated benzene hydrocarbon containing from 9 to 15 carbon atoms in the alkyl group.

JOHN A. NEVISON.

References Cited in the file of this patent

UNITED STATES PATENTS

| Number | Name | Date |
|---|---|---|
| 1,903,466 | Limburg | Apr. 11, 1933 |
| 2,244,512 | Brandt | June 3, 1941 |
| 2,396,673 | Blumer | Mar. 19, 1946 |
| 2,448,184 | Lemon | Aug. 31, 1948 |
| 2,450,585 | D'Ouville | Oct. 5, 1948 |
| 2,457,146 | Grote | Dec. 28, 1948 |
| 2,509,863 | Harlan | May 30, 1950 |
| 2,543,885 | Wilson | Mar. 6, 1951 |

FOREIGN PATENTS

| Number | Country | Date |
|---|---|---|
| 109,709 | Great Britain | Sept. 27, 1917 |